(No Model.)
F. A. CULLEN.
GATE HANGER.
No. 505,195. Patented Sept. 19, 1893.
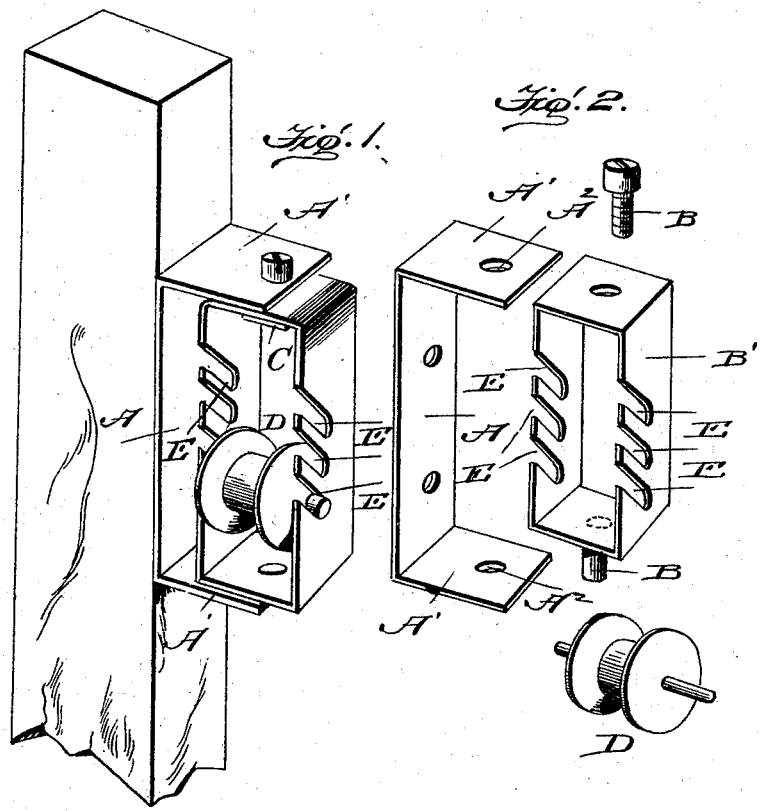
Witnesses
May E. Moore
Wm. Cashiell
Frank A. Cullen.
Inventor
by Wm. N. Moore,
Attorney

UNITED STATES PATENT OFFICE.

FRANK A. CULLEN, OF JACKSON, MICHIGAN.

GATE-HANGER.

SPECIFICATION forming part of Letters Patent No. 505,195, dated September 19, 1893.

Application filed February 7, 1893. Serial No. 461,373. (No model.)

*To all whom it may concern:*

Be it known that I, FRANK A. CULLEN, a citizen of the United States, residing at Jackson, in the county of Jackson and State of Michigan, have invented certain new and useful Improvements in Gate-Hangers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in gate hangers, adapted specially for use in connection with sliding gates, and the object of my invention is the provision of a simple, durable, compact and inexpensive device of this character.

To attain the desired objects the invention consists of a gate hanger embodying novel details of construction and arrangement of parts substantially as herein shown and described.

Figure 1 represents a perspective view of my hanger in position, and Fig. 2 represents a perspective view of the hanger with the parts detached.

My device is very simple and is adapted to be sold complete ready for application and consists of the base plate A adapted to be secured to the ground post and having the extensions A' at right angles thereto provided with the journals or openings $A^2$, to receive the studs B on the rectangular open frame or casing B'. The upper stud is preferably a screw or pivot which enters a block or nut C, whereby the roller frame may be detached.

In the open frame is mounted the roller or pulley D, and the frame is preferably provided with a series of bearings E in the form of an open or bayonet slot to enable the roller to be adjusted vertically to raise or lower the gate when desired. It is frequently necessary to raise or lower the gate and this may be done quickly and easily by simply adjusting the roller in any of the bearings and this is an important feature of my invention. From this construction it will be seen that I provide a gate hanger which is of very simple, durable and inexpensive construction, which is compact and portable, which will permit of adjustment of the gate whenever desired, which can be easily applied or removed and which is generally efficient.

I claim—

A gate hanger consisting of the base plate made of a single piece of flat metal having the extensions provided with openings or bearings, the rectangular open roller frame having a series of inclined open bearings a stud bearing in one of the bearings, the removable stud in the other bearing, the block receiving said stud, and the roller mounted in the open frame in one set of the open bearings.

In testimony whereof I affix my signature in presence of two witnesses.

FRANK A. CULLEN.

Witnesses:
HENRY J. KING,
BENJAMIN F. BURGESS.